United States Patent [19]

McCulloch et al.

[11] 4,020,187
[45] Apr. 26, 1977

[54] METHOD OF PRODUCING DRY PET FOOD

[75] Inventors: Michael G. McCulloch, Topeka; Woodrow E. Nelson, Berryton, both of Kans.

[73] Assignee: Theracon, Inc., Topeka, Kans.

[22] Filed: Dec. 9, 1974

[21] Appl. No.: 530,929

[52] U.S. Cl. .................................. 426/72; 426/74; 426/331; 426/335; 426/532; 426/623; 426/657; 426/448; 426/805; 426/516

[51] Int. Cl.² ................... A23L 1/30; A23L 3/34

[58] Field of Search .......... 426/805, 560, 646, 559, 426/446, 447, 72, 73, 74, 516, 519, 331, 335, 622, 623, 657, 448

[56] References Cited

UNITED STATES PATENTS

| | | | |
|---|---|---|---|
| 3,365,297 | 1/1968 | Burgess et al. | 426/623 |
| 3,447,929 | 6/1969 | Hale | 426/513 |
| 3,595,666 | 7/1971 | Dunning et al. | 426/48 |
| 3,653,908 | 4/1972 | Buck et al. | 426/516 |
| 3,857,968 | 12/1974 | Haas | 426/805 |

Primary Examiner—Hiram H. Bernstein
Attorney, Agent, or Firm—Beveridge, DeGrandi, Kline & Lunsford

[57] ABSTRACT

The method of producing a dry expanded pet food by extrusion cooking of a blended mixture of proteinaceous material slurry and dry farinaceous material. The proteinaceous material slurry is adjusted to have a fat content of at least 25%, is elevated to a temperature in the range of 150° to 175° F, and then homogenized to reduce particle size and distribute the fat content uniformly through the mixture. Farinaceous materials constituting an appropriate dried ground mix of cereals, vitamins, minerals, and preservatives are added to the proteinaceous slurry. Following the extrusion cooking step, which results in the expansion of the cooked material, the cooked material is dried to a water content of from 7% to 15%, resulting in a microbiologically stable, appetizing animal food.

3 Claims, No Drawings

METHOD OF PRODUCING DRY PET FOOD

BACKGROUND OF THE INVENTION

The manufacture of pet foods comprising extrusion cooking mixtures of proteinaceous material, such as raw meat or poultry offal, with a ground mix of cereals, followed by drying is disclosed in the prior art, as for example, in U.S. Pat. No. 3,447,929 to Hale. To make such prior art foods appetizing to dogs and cats, it has been necessary to spray the resultant dry product with a substantial amount of a lard or other fat-containing material, resulting in a product that is externally greasy and hence unpleasant to handle and difficult to package except in grease-resistant plastic bags.

OBJECTS OF THE INVENTION

An object of this invention is to provide an improved dried, expanded pet food and a method of manufacturing same which results in a nutritious food which has been proven to be appetizing to pets and does not have an externally greasy surface.

A specific object of this invention is to provide an improved process for producing a dried, expanded nongreasy pet food with adequate fat content to make the same appetizing to pets.

Other objects and advantages of this invention will become apparent to those skilled in the art from the following detailed description.

DESCRIPTION OF THE INVENTION

As mentioned above, most dried pet foods are produced by extrusion cooking of a mixture of meat and meat by-products with appropriate dry cereals, vitamins, minerals and some preservatives. Meat or meat by-products obviously constitutes economical remnants from the butchering operation which are generally not suited for human consumption, such as lungs, tripe, tongue, kidneys, beef lips and poultry offal, such as heads, feet, viscera, etc. Characteristically, this class of meat and meat by-products has a low fat content, and it has been common in the prior art to spray the final product with quantities of lard or tallow ranging up to 10% in order to make the resulting product appetizing to animals. In accordance with our invention, sufficient tallow or lard is added to a water slurry of a ground mixture of the aforementioned meat and meat by-products to raise the resulting fat content of the mixture to at least 25% and preferably 30%. The resulting mixture is then run through a homogenizer or emulsifier to mechanically liquefy and reduce the particle size and, at the same time, uniformly distribute the fat content through the meat mix.

Prior to the homogenization step, the meat mixture is heated to a temperature range of 160° to 170° F, thus insuring liquefaction of the fat content and the resulting homogenized mix is held at a temperature of at least 150° F.

The dry facinaceous ingredients are first ground to obtain a final size of at least 30 mesh, and then the dry material is added to the heated homogenized meat mixture. The preferred proportions of the resultant mix range from at least 25% of the meat mixture to 50%, depending on the desired finished product, but more importantly, insuring that the minimum fat content of the final product will be at least 7½%.

After metering the wet and dry ingredients to obtain the aforementioned proportions, mixing is accomplished in a high-speed blender. The blended mixture is then pumped through a conventional extruder-cooker, where the product is subjected to temperatures of from 225° to 325° F and a pressure of at least 50 p.s.i. The mixture is rapidly cooked and passes through an extruder die to the atmosphere in the form of a rope. At this point, the hot product is at a temperature of at least 250° F and an instantaneous flashing of the water contained in the extruded product occurs due to the substantial change in temperature and pressure. The flashing of the water into steam produces an expansion of the extruded rope of material and at a point where the extruded rope is cooled to a level below 200° F. It is cut into small, chunklike pieces by a rotating knife. The product at this point is therefore in sterile chunks generally containing from 15% to 25% moisture. The product is then immediately passes through a conventional dryer, and the water content is removed to obtain a final moisture content of from 7% to 15%.

Due to the low moisture content of the final product and to anti-mold agents, such as potassium sorbate, incorporated in the dry mix, the product is micro-biologically stable. More importantly, our tests have shown that the resulting product has surprising appetite appeal to pets. It is not externally greasy and may be packaged in ordinary paper bags or any type of plastic wrap.

Following are two specific examples of meat and dry mixes that have been utilized in the above-described process:

EXAMPLE 1

| Dry Mix | |
|---|---|
| Corn flour | 24 lbs |
| Wheat flour | 13 lbs |
| Soy flour | 12 lbs |
| Meat meal | 10 lbs |
| Yeast, brewers | 3 lbs |
| Nonfat dried milk | 2 lbs |
| Vitamins and minerals | ½ lb |
| Potassium sorbate | ¼ lb |
| Miscellaneous | ¼ lb |
| | 65 lbs |
| Meat Mix | |
| Meat and meat by-products (chicken, liver kidneys, lungs, tripe, tongue, beef lips, etc.) | 31 lbs |
| Animal tallow | 4 lbs |
| | 35 lbs |

Example 2
EXAMPLE 2

| Dry Mix | |
|---|---|
| Corn flour | 24 lbs |
| Wheat flour | 13 lbs |
| Soy flour | 12 lbs |
| Yeast, brewers | 3 lbs |
| Nonfat dried milk | 2 lbs |
| Vitamins and minerals | ½ lb |
| Potassium sorbate | ¼ lb |
| Miscellaneous | ¼ lb |
| | 55 lbs |
| Meat Mix | |
| Meat and meat by-products (as in previous example) | 41 lbs |
| Animal tallow | 4 lbs |
| | 45 lbs |

In each of the above examples, the amount of animal tallow added to the meat mix is sufficient to bring the total fat content of the meat mix up to the level of at least 25%.

What is claimed is:

1. The process of manufacturing an expanded animal food product comprising:
   1. grinding a quantity of meat and meat by-products;
   2. adding water and fat to product a meat slurry of over 25% fat content;
   3. heating said mixture to a temperature sufficient to liquefy said fat;
   4. homogenizing said heated mixture to reduce particle size and distribute fat content uniformly through the mixture;
   5. preparing a dried ground mix of cereals and appropriate vitamins, minerals, and preservatives;
   6. combining the heated meat slurry and the dry mix in such proportions that (involving from 30% to 50% of) the meat slurry represents 25% to 50% of the mixture by weight, and mixing same in a blender;
   7. extrusion cooking the mixture at temperatures from 225° to 325° F. and pressures in excess of 50 p.s.i. and extruding the cooked material to atmospheric conditions through a die at a temperature in excess of 225° F., thereby expanding the cooked product by flashing of contained water to steam; and
   8. heating the expanded product to remove only water to attain a moisture content of 7% to 15%, thereby producing a micro-biologically stable, appetizing animal food with a minimum fat content on the order of 7.5%.

2. A process as defined in claim 1 wherein step (3) is carried out at a temperature from 150° to 170° F.

3. A dried expanded pet food product produced in accordance with claim 1.

* * * * *